United States Patent [19]

Liu

[11] Patent Number: 4,986,564
[45] Date of Patent: Jan. 22, 1991

[54] ADJUSTABLE MECHANISM FOR A SEAT BACK OF A STROLLER

[76] Inventor: Dong-Shuei Liu, No. 1, Sec. 3, Chung Shan Rd., Tan Tzu Hsiang, Taichung Hsien, Taiwan

[21] Appl. No.: 493,200

[22] Filed: Mar. 14, 1990

[51] Int. Cl.⁵ .............................................. B62B 9/12
[52] U.S. Cl. ................................. 280/642; 280/650; 280/47.4; 297/374
[58] Field of Search ............... 280/642, 644, 747, 649, 280/650, 658, 47.38, 47.4; 297/354, 355, 374, 375, 376, 377

[56] References Cited

U.S. PATENT DOCUMENTS

| | | | |
|---|---|---|---|
| 2,845,994 | 8/1958 | Thompson | 297/375 X |
| 4,007,947 | 2/1977 | Perego | 280/650 X |
| 4,111,454 | 9/1978 | Kassai | 280/649 |
| 4,714,292 | 12/1987 | Kassai | 280/47.4 X |
| 4,805,928 | 2/1989 | Nakao et al. | 280/642 |

FOREIGN PATENT DOCUMENTS 3008011 9/1981 Fed. Rep. of Germany ..... 280/47.4
2394276 2/1979 France ................................. 297/377

Primary Examiner—David M. Mitchell
Assistant Examiner—Brian L. Johnson
Attorney, Agent, or Firm—Morton J. Rosenberg; David I. Klein

[57] ABSTRACT

An adjustable mechanism is provided for adjusting a seat back of a stroller which has two vertical posts. The adustable mechanism includes a stop disposed on each vertical post, a sleeve, and a button insertable into the sleeve. the vertical post and the stop are slidably received in the sleeve and the button. A spring element viases the button forward to engage with the stop so that the sleeve can not move downwrad. The sleeve is freely movable downwards along the vertical post when the button is slightly depressed against the spring element.

5 Claims, 6 Drawing Sheets

4,986,564

ADJUSTABLE MECHANISM FOR A SEAT BACK OF A STROLLER

BACKGROUND OF THE INVENTION

The present invention relates to an adjustable mechanism, and more particularly to an adjustable mechanism for a seat back of a stroller.

The increasing local travel of parents in and about the suburbs on errands and the like and the fact that their young children usually accompany them, has brought forth the need for convenient strollers or the like. Strollers and baby carriages usually have seats comprising flat, hinged-together boards surrounded by flexible fabric. The seat backs thereof are usually upright and unadjustable, which is not comfortable for infants who sleep most of the time.

The present invention has arisen to mitigate and/or obviate the afore-described disadvantages of the conventional seat back of the strollers.

SUMMARY OF THE INVENTION

The primary objective of the present invention is to provide an adjustable mechanism for a seat back of a stroller or the like, in which the seat back thereof can be adjusted quickly and easily.

In accordance with one aspect of the invention, there is provided an adjustable mechanism for a seat back of a stroller, in which the stroller has two vertical posts and two inclined posts pivotally connected together at an upper portion. Two bars are horizontally supported on the lower portion of the vertical posts and the inclined posts. A lower end of a rod is pivotally connected to each bar between the vertical post and the inclined post. The adjustable mechanism includes one or more stops disposed on an inner surface of each vertical post, a sleeve having a through hole, an opening formed in the sleeve, a button having a center hole. The through hole of the sleeve and the center hole of the button are large enough for slidably receiving the vertical post and the stop. A spring element is biased between the sleeve and the button. A lever arm is pivotally connected between the sleeve and the rod. The spring element biases the button forward so that the button is engageable with one of the stops and so that the sleeve can not move downward. The sleeve is freely movable along the vertical post when the button is slightly depressed against the spring element.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
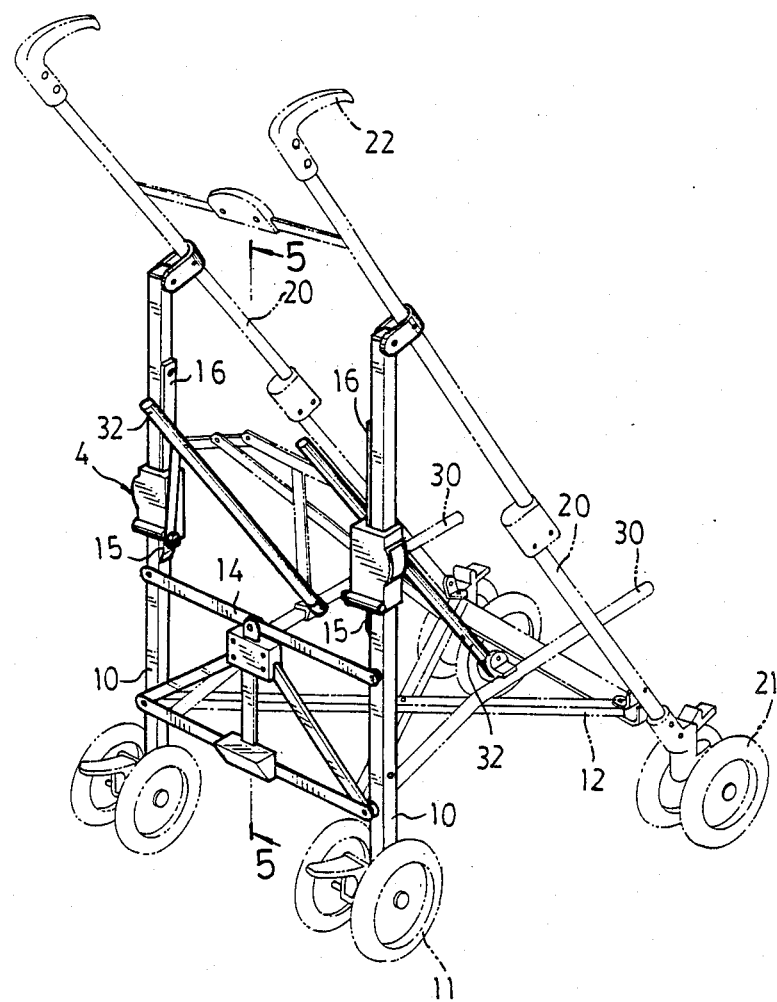
FIG. 1 is a perspective view of a stroller which employs an adjustable mechanism for a seat back in accordance with the present invention.
Figure 2:
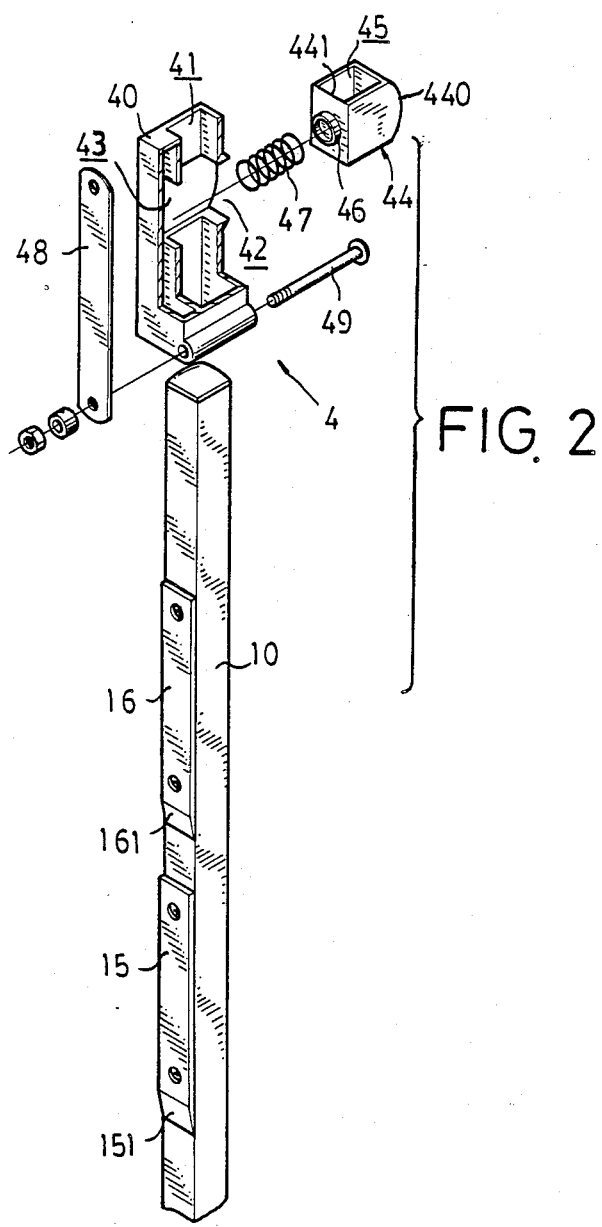
FIG. 2 is an exploded view of the adjustable mechanism.

Referring to the drawings and initially to FIGS. 1 and 2, illustrated are a stroller and an adjustable mechanism for a seat back of the stroller in accordance with the present invention. The stroller generally comprises two vertical posts 10 and two inclined posts 20 pivotally connected together at an upper portion thereof. The lower portion of the vertical posts 10 and the inclined posts 20 are connected together by a base portion 12 and a frame portion 14. A wheel 11 is provided at the lower end of each vertical post 10 and a wheel 21 is provided at the lower end of each inclined post 20. A handle 22 is provided on an upper end of each inclined post 20.

Two bars 30 are substantially horizontal, the rear ends thereof are pivotally connected to the lower portion of the vertical posts 10 and the substantially middle portions thereof are pivotally connected to the lower portion of the inclined posts 20. A lower end of a rod 32 is pivotally connected to a substantially intermediate position of each bar 30 between the vertical post 10 and the inclined post 20. A flexible fabric which is known in the art is extended and stretched between the bars 30 and the rods 32 so as to form the seat portion of the stroller.

Two stops or stripes 15, 16 are fixed on the inner surface of each vertical post 10. Each stripe 15, 16 has a substantially level upper end or surface which is preferably perpendicular to a longitudinal axis of the vertical post 10, and has a taper surface 151, 161 formed at a lower end thereof.

A sleeve 40 has a through hole 41 longitudinally formed in a center portion thereof for slidably receiving a respective vertical post 10. The inner perimeter of the through hole 41 is large enough for slidably receiving the vertical post 10 and the respective strips 15, 16. An opening 42 is formed in a vertical surface of each sleeve 40 and is communicated with the respective through hole 41. A recess 43 is formed in the sleeve 40 opposite to the opening 42. A button 44 which is substantially a segment of a square tube has a center hole 45 as large as the through hole 41 of the sleeve 40 for slidably receiving the vertical post 10 and the strips 15, 16. A disc or ring 46 is formed on the rear end of the button 44. One end of a spring element 47 is clamped on the disc 46 of the button 44. The front surface of the button 44 is preferably spherical. The upper end 441 of the rear wall of the button 44 is tapered. One end of each lever arm 48 is pivotally connected to the lower end of a sleeve 40 by a pin, pivot axle 49 or the like. The other end of each lever arm 48 is pivotally connected to a free end of a respective rod 32 (FIG. 1).

Figure 3:
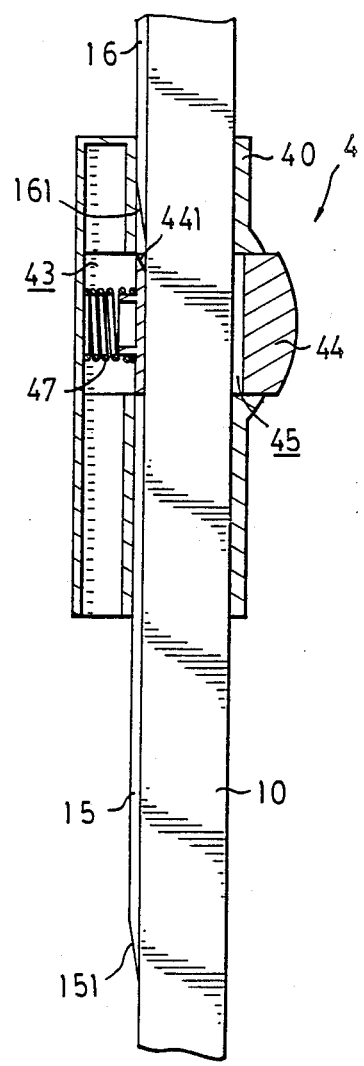
FIG. 3 is a cross sectional view of the adjustable mechanism.
Figure 4:
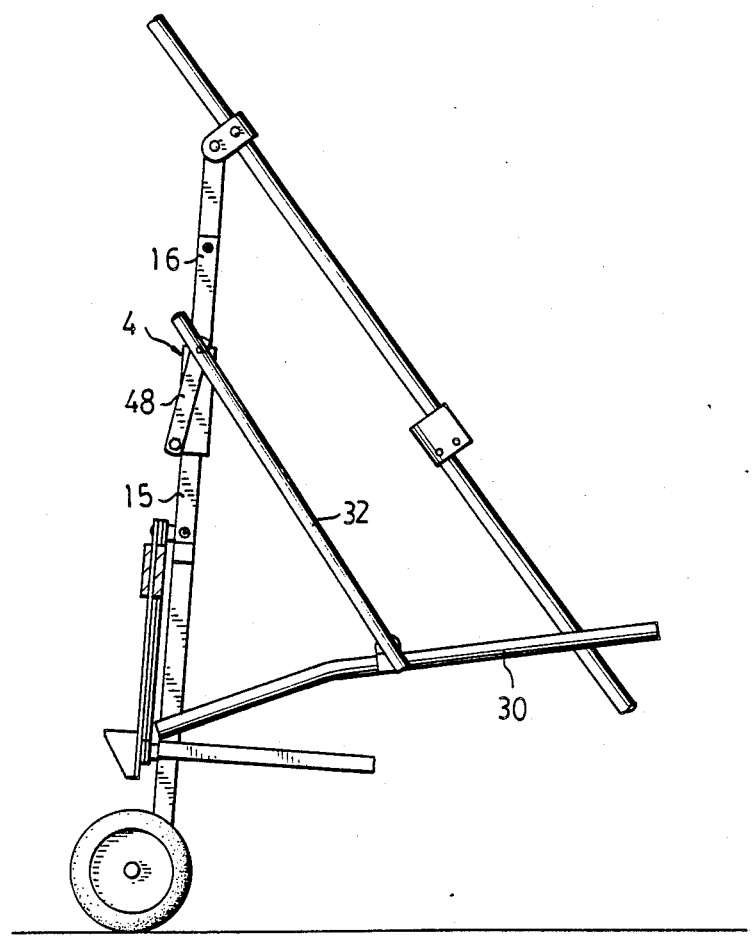
FIGS. 4, 5 and 6 are partial cross sectional views taken along lines 5—5 of FIG. 1, illustrating three positions of the seat back of the stroller.

Referring next to FIG. 3, when the rear end of the button 44 with the spring element 47 is inserted and pushed into the opening 42 of the sleeve 40 and the spring element 47 bears within the recess 43 of the sleeve 40, the through hole 41 of the sleeve 40 and the center hole 45 of the button 44 are aligned so that the vertical post 10 is insertable through the holes 41 and 45. When the button 44 is released, the spring element 47 biases the button 44 forward against the rear surface of the vertical post 10. As showing FIGS. 3 and 4, the rear end of the button 44 engages with the upper level end of the stripe 15 so that the sleeve 40 can not move downward. The seat back or the rods 32 of the stroller are substantially located at an inclined position as showing FIG. 4.

Figure 5:
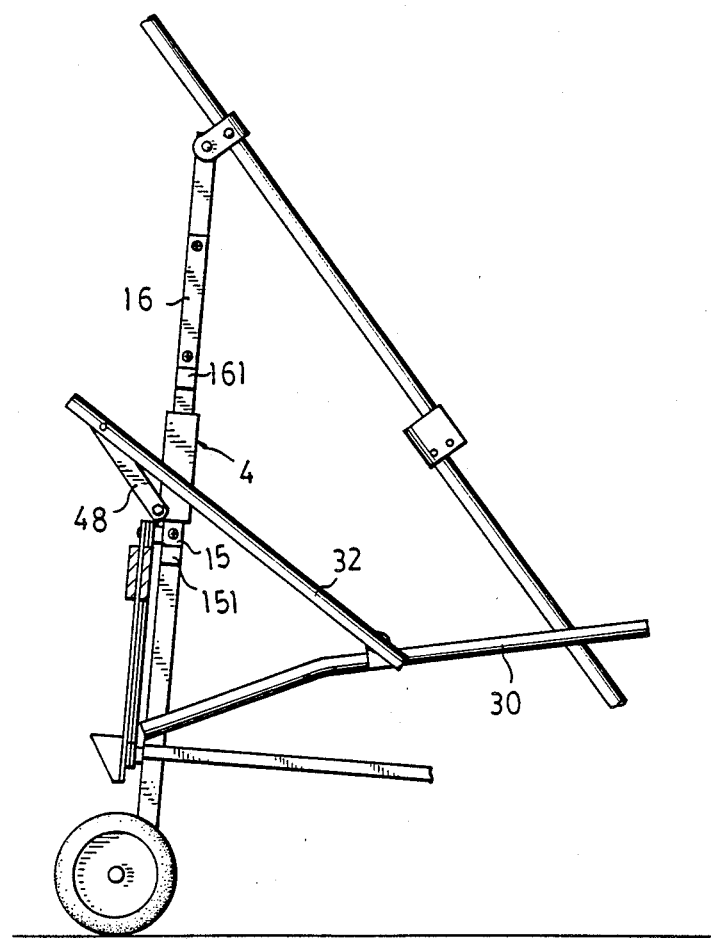

If it is desired to lay down the seat back of the stroller, it is necessary only to depress the buttons 44 against the bias of the spring elements 47 so that the rear end of the button 44 is not engaged with the upper level end of the stripe 15 and so that the sleeve 40 is freely to move downward along the vertical post 10 until the upper portion of the rods 32 contact and rest on the upper end of the frame 14 (FIG. 1). The seat back or the rods 32 of the stroller are substantially located at a laid down position as shown in FIG. 5.

Figure 6:
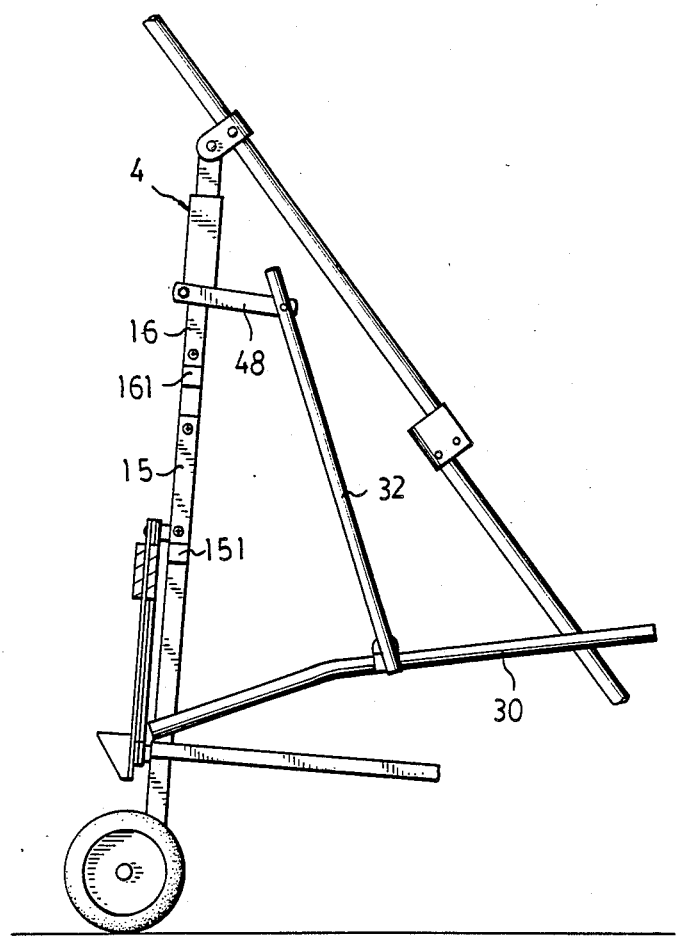

If it is desired to raise the seat back of the stroller, it is necessary only to pull the sleeves 40 upwards. The sleeve 40 can move upward freely relative to the vertical post 10 because the button 44 is pushed rearward against the spring element 47 when the tapered end 441 of the rear wall of the button 44 slides along the tapered surface 151, 161 of the stripe 15, 16. No depression of the button 44 is required. When the button 44 moves upward beyond the stripe 16, the spring element 47 biases the button 44 forward again so that the rear end of the button 44 engages with the upper level end of the stripe 16 and so that the sleeve 40 can not move downward. The seat back or the rods 32 of the stroller are substantially located at an upright position as shown in FIG. 6.

Accordingly, the seat back of the stroller can be adjusted quickly and easily by the adjustable mechanism for the seat back of the stroller in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An adjustable mechanism for a seat back of a stroller, said stroller generally comprising two vertical posts and two inclined posts pivotally connected together at an upper portion thereof, a base portion being connected between a lower portion of said vertical posts and said inclined posts, a frame portion being connected between said lower portion of said vertical posts, a rear end of a bar being pivotally connected to said lower portion of each said vertical post and a substantially intermediate position of said bar being pivotally connected to said lower portion of a respective inclined post, a lower end of a rod being pivotally connected to each said bar between said vertical post and said inclined post; characterized in that said adjustable mechanism comprises at least one stop disposed on an inner surface of each said vertical post, a sleeve having a through hole formed along a longitudinal axis thereof, an opening being formed in a surface of said sleeve, a button having a center hole, said through hole of said sleeve and said center hole of said button being large enough for slidably receiving said vertical post and said stop, a spring element being biased between each said sleeve and a respective button, a lower end of a lever arm being pivotally connected to a lower end of each said sleeve and an upper end of said lever arm being pivotally connected to an upper end of a respective rod; said spring element biases said button forward so that said button is engageable with one said stop and so that said sleeve can not move downward; and said sleeve is freely movable downwards along said vertical post when said button is slightly depressed against said spring element.

2. An adjustable mechanism according to claim 1, wherein said button is substantially a segment of a square tube, a ring is formed on a rear end of said button, and one end of said spring element is engaged with said ring of said button.

3. An adjustable mechanism according to claim 1, wherein a recess is formed in each said sleeve opposite to said opening, and said spring element is received in said recess and biased between said sleeve and said rear end of said button.

4. An adjustable mechanism according to claim 1, wherein each said stop is substantially a stripe having a level upper end, a tapered surface is formed at a lower end of each said stripe, and said button is pushed rearward against said spring element when a rear end of each said button slides along said tapered surface of a respective stripe so that said sleeve can move upward freely relative to said vertical post.

5. An adjustable mechanism according to claim 4, wherein an upper end of said rear end of each button is tapered.

* * * * *